Sept. 5, 1933.  J. L. MAULL  1,925,196
FRUIT JUICE EXTRACTING APPARATUS
Original Filed March 28, 1931  2 Sheets-Sheet 1
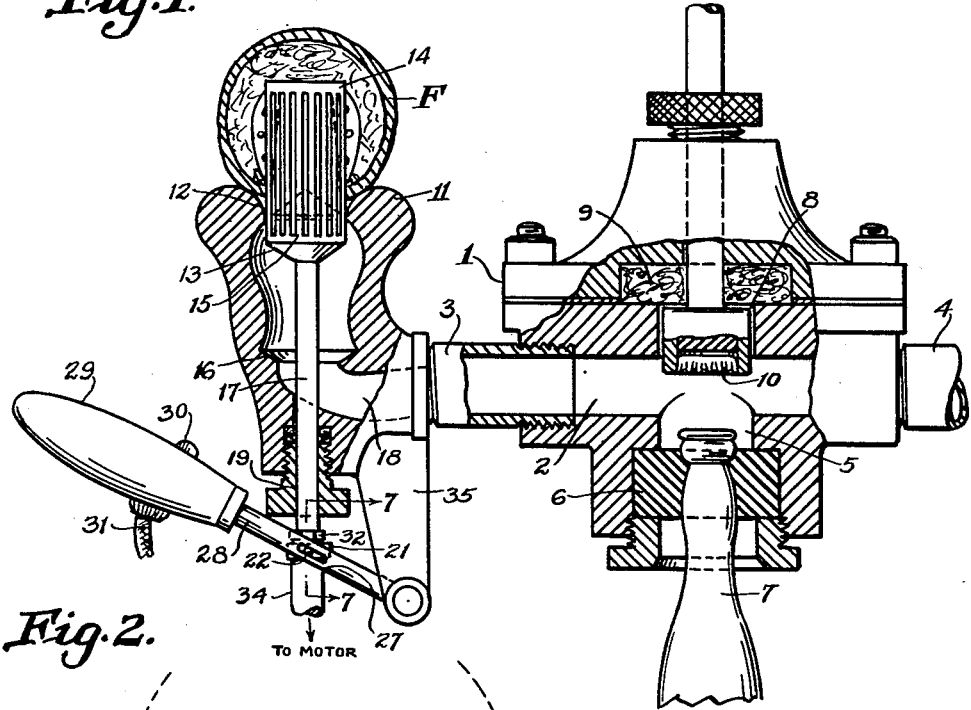
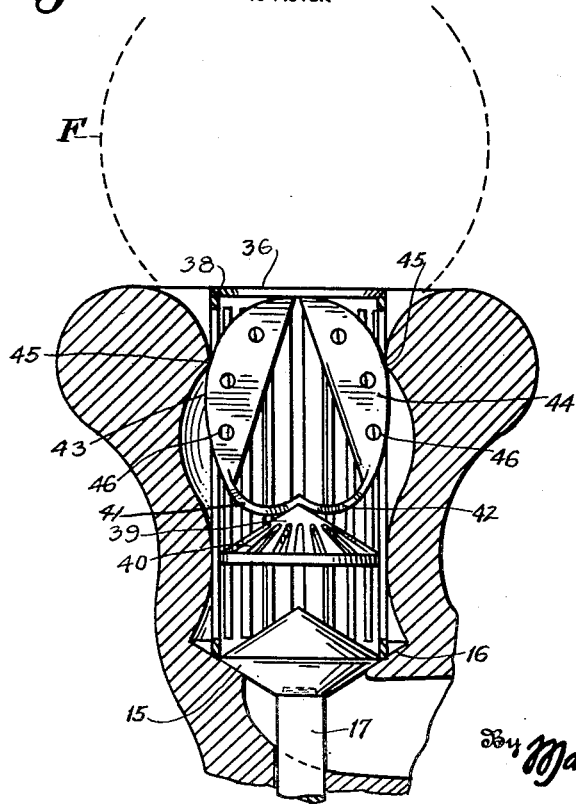
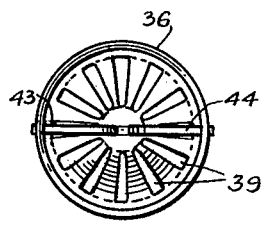
Inventor
J. L. Maull
By Mason Fenwick Lawrence
Attorneys Sept. 5, 1933.　　　　J. L. MAULL　　　1,925,196
FRUIT JUICE EXTRACTING APPARATUS
Original Filed March 28, 1931　　　2 Sheets-Sheet 2
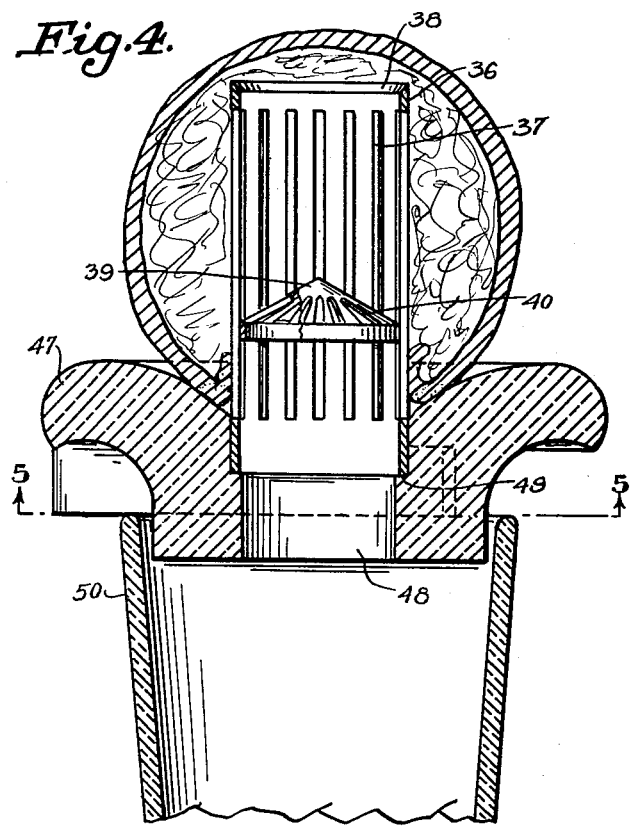
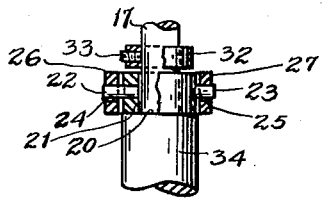
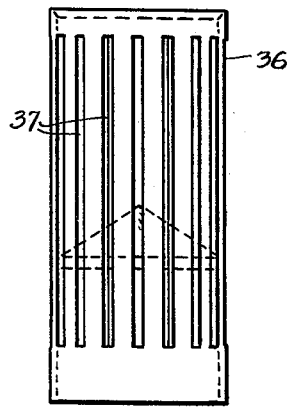
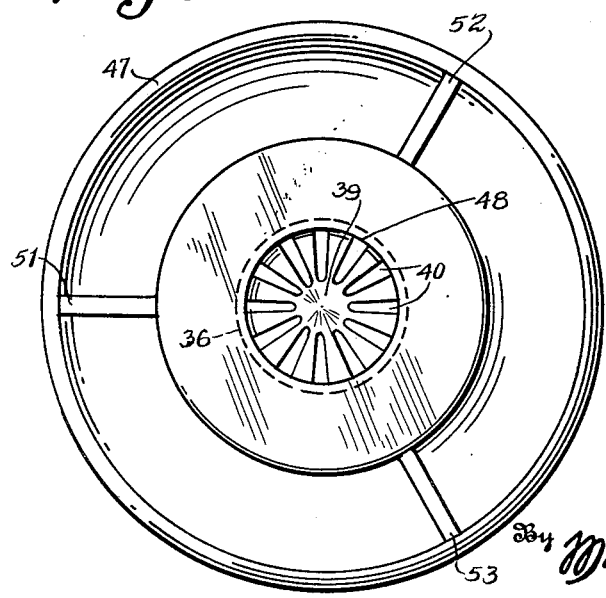
Inventor
J. L. Maull
By Mason Fenwick Lawrence
Attorneys Patented Sept. 5, 1933

1,925,196

UNITED STATES PATENT OFFICE 1,925,196

FRUIT JUICE EXTRACTING APPARATUS

James L. Maull, Orlando, Fla.

Application March 28, 1931, Serial No. 526,067
Renewed June 8, 1933

11 Claims. (Cl. 146—3)

This invention relates to devices for extracting juice from citrus fruits, and from other fruits having a tough outer rind or skin somewhat similar to that of oranges, lemons, etc.

As is well known in this art it is exceedingly difficult to extract juices from citrus fruits and to preserve the extracted juices, because the air coming in contact with the extracted juices ordinarily spoil the juices and renders them eventually unfit for consumption. It is therefore the main object of this invention to provide a device or machine for extracting the juices from citrus fruits, with the exclusion of air, and bottle such juices under vacuum in order to prevent them from spoiling and preserve their natural flavors during storage.

Another object of the invention is to provide a juice extractor which not only extracts the juice from the fruit but also strains out the seeds and pulp in one operation, and leaves the seeds and pulp inside the fruit and in the core after extraction of the juices.

Further object of the invention is to provide a machine for extracting juices from citrus fruits under vacuum, and in which the fruit itself serves as a sealed contact to prevent air from flowing into the extracting machine and mixing with the extracted juice during the operation of the machine.

Still another object of the invention is to provide the juice extractors of machines of the type referred to, and manually operated extractors, with extracting knives which are inserted through the center of the fruit and expand when in the fruit in order to insure a thorough break-down of the cells of the fruit without breaking the outer skin or rind and thereby breaking the vacuum due to contact with the skin or rind and the fruit supporting member.

Other objects of the invention will become apparent as the detailed description thereof proceeds.

In the drawings:

Figure 1 is a central longitudinal section through an apparatus embodying this invention and adapted to extract juices from citrus fruits, while preserving the extracted juices from contact with the air;

Figure 2 is a central vertical section through a fruit juice extracting member, and a support for the fruit during the extraction operation;

Figure 3 is a top plan view of the juice extractor removed from its supporting member;

Figure 4 is a central vertical section through a manually operated form of the invention;

Figure 5 is a plan view of the extractor shown in Figure 4;

Figure 6 is an elevation of one of the elements of the extractor forming a part of this invention; and Figure 7 is a fragmentary vertical section, to an enlarged scale, taken on the line 7—7 of Figure 1.

As shown particularly in Figure 1 of the drawings, the vacuum apparatus comprises a casing 1, suitably mounted on any convenient type of standard or support. The casing 1 is provided with a bore 2 screwthreaded at its opposite ends to receive the pipes 3 and 4. The pipe 4 is connected up to any suitable type of air pump for exhausting air from the bore 2 and any other piping connected thereto.

The casing 1 is provided with a bore 5 extending at right angles to the bore 2, and this bore 5 is provided with suitable packing mechanism including a rubber or resilient washer 6 adapted to receive the neck 7 of a bottle intended to receive fruit juices flowing through the bore 2.

Directly opposite the bore 5, the casing 1 is provided with a bore 8 in which is slidably mounted the head 9 of a capping device adapted to receive a crowned cap 10 of the usual type to be forced on to the mouth of the bottle having the neck 7 arranged in the bore 5. The details of the capping mechanism form no part of the present invention; therefore, only sufficient parts thereof are shown to indicate that the capping of the bottle is effected under vacuum.

The pipe 3 is screwthreaded at its outer end to receive a fruit supporting cup 11, having a mouth 12 at the upper end shaped to receive and support citrus fruits of various sizes and to form a vacuum seal with such fruits when the latter are placed in position for operation by the extracting mechanism.

As will be seen from Figure 1 of the drawings the cup 11 is in the form of an elbow connected to the pipe 3. The vertical part of the cup 11 is shaped to form a chamber 13 in which the juice extractor 14 is mounted to reciprocate. The bottom 15 of this extractor 14 is beveled to form a valve adapted to seat on a correspondingly beveled valveseat 16; and this valve 15 has a piston rod 17 connected thereto to cause reciprocation of the said extractor in the chamber 13, and beyond the upper end of the cup 11.

A passage way 18 connects the chamber 13 with the pipe 3 and the bore 2 of the bottling mechanism. The piston rod 17 extends through the bottom of the cup 11 and a packing gland 19 forms an air-tight connection between the bottom of the cup 11 and piston rod 17.

The piston rod 17 is enlarged at its lower end to form a shoulder 20 (see Figure 7), and a yoke sleeve 21 having diametrically opposite pins 22 and 23 rotatably mounted in apertures 24 and 25 respectively, formed in the arms 26 and 27 of a yoke lever 28 which is provided with an operating handle 29 suitably connected to a push bottom switch 30, which controls the operation of a motor (not shown) through the conductors 31. The sleeve 21 is held rotatably against the shoulder 20 by means of a sleeve 32 which is secured to the piston rod 17 by a set screw 33.

It will be obvious from the foregoing description that the piston rod 17 may be raised and lowered by means of the handle 29 and yoke lever 28 in order to cause the extractor 14 to project from the cup 11 into the fruit F. It will be understood that the lower part 34 of the piston rod is slidably mounted in a gear suitably connected to a motor so that the piston rod 17 may be rotated throughout its reciprocating movements through the cup 11. This connection is common in all the arts and can be readily supplied by any skilled mechanic. The ends of the arms 26 and 27 are pivotably connected to the lower end of a bracket 35 which extends downwardly from the lower part of the cup 11.

The juice extractors 14 comprises a cylinder 36 having a series of longitudinal slots 37 extending parallel to the axis of the cylinder. The upper end of the cylinder is beveled to form a knife-edge 38 intended to cut through the skin and pulp of the fruit F when the latter is placed in position on the said cup and the cylinder is moved upwardly by operation of the handle 29.

Between the upper and lower ends of the cylinder 36 there is secured a conical member 39, the conical wall of which is provided with a series of slots 40 designed to permit the fruit juice to flow from the fruit F and through the slots 37 and into the chamber 13 leading to the bore 2 of the bottling apparatus. To facilitate the breaking down of the juice cells in the fruit F, the conical member 39 has secured to its apex a number of leaf springs 41 and 42 (see Figure 2), which in turn have the cutting knives 43 and 44 secured thereto.

The juice extractor is shown in retracted position in Figure 2. In this figure it will be noted that the arcuate edges of the knives 43 and 44 contact with the edge 45 of the cup 11, and are held by this edge wholly within the cylinder 36. When the piston rod 17 and the cylinder 36 are moved upwardly through the top of the cup 11 and into the fruit F the cutting knives 43 and 44 are expanded by their springs 41 and 42 and therefore, cut into the pulp of the fruit F without breaking the skin or rind of the fruit and without breaking the vacuum seal between the fruit and the mouth of the cup 11. The knives 43 and 44 may be provided with any desired number of apertures 46 to lessen their resistance to movement of the knives through the fruit pulp.

While there are only two knives shown in the drawings it must be understood that any desired number of knives may be used in this juice extractor. It will be obvious from the drawings that these knives can be operated in pairs or singly because their peculiar shape adapts each knife to be wholly retracted within the cylinder 36 without contacting with any of the other knives.

In the manually operated form of the juice extractor shown in Figures 4 and 5 of the drawings, the cutting cylinder is the same as that shown in the mechanically operated apparatus. In this form of the invention, however, the cup 11 is omitted; and a support 47 takes the place of the cup 11. This support 47 has the fruit supporting part thereof shaped similarly to the upper part of the cup 11; and is provided with a central bore 48 which is counter-sunk at its upper end to form a supporting shoulder 49 for the lower end of the cylinder 36.

The lower part of the support 47 is made of such dimensions as to adapt it to be readily inserted in the mouth of a glass or other container 50. In order to hold the support steadily on the glass 50, this support is provided with three laterally extending wings 51, 52 and 53 having their lower edges coplanar. While the support 47 may be provided with any desired number of these supporting wings, it is preferable to have only three of these wings spaced apart equidistantly around the support, in order to insure the said support being held steadily on the mouth of the glass or other container.

While I have described the switch 30 in the handle 29 as adapted to control the operation of the motor for rotating the piston rod, it must be understood that the same motor will control the operation of a pump for exhausting air to the bore 2 of the capping apparatus. It would obviously be undesirable to have this motor and pump operating while it is not performing any useful function; that is, when the apparatus is not actually used for extracting juice from a fruit placed on the support 11.

The cylindrical juice extractor, as shown in Figure 6, constitutes one of the most important features of this invention, since it operates as a separator to separate the pulp, seeds, etc. from the juice and thereby eliminates the necessity of straining or filtering the juice. The cylindrical shape of the extractor is peculiarly adapted for separating the core from the juice cells of citrus fruits; and the longitudinal slots through the cylindrical surface are of great utility in permitting the free flow of juice from the juice cells into and through the center of the cylinder to any container or support with which the cylinder might be used. Of course any shaped apertures may be substituted for the slots in the cylinder, and these may be arranged in any desired manner. However, the slotted form is preferable.

While I have illustrated the invention as being embodied in certain specific forms, it is to be understood that these forms may be varied without departing from the spirit of the invention, which must not be considered as limited in any way except by the scope of the claims appended hereto.

What I claim is:

1. In fruit juice extracting apparatus a fruit-supporting cup extending therefrom and adapted to be sealed by fruit supported thereon, a fruit cutter reciprocable in said cup, means for reciprocating said cutter, means for rotating said cutter, means connected to said cup for conducting liquids therefrom, a bottle capper connected to the last named means, and means for exhausting air from the bottle capper and cup when the latter is sealed by fruit supported thereby.

2. A fruit juice extractor comprising a fruit supporting cup having a bore extending through the bottom thereof, a cylinder reciprocable into and out of said cup and having its upper end beveled to form a cutting edge, said cylinder being provided with a series of slots extending lengthwise thereof, a pulp supporting apertured member secured in said cylinder between the ends thereof, and means for reciprocating said cylinder.

3. A fruit juice extractor comprising a fruit supporting cup having a bore extending through the bottom thereof, a cylinder reciprocable into and out of said cup and having its upper end beveled to form a cutting edge, said cylinder being provided with a series of slots extending lengthwise thereof, a pulp supporting apertured member secured in said cylinder between the ends thereof, a piston rod slidable in said bore and having its upper end connected to said cylinder, means for rotating said piston rod and cylinder, and means for reciprocating said rod and cylinder.

4. Fruit juice extracting apparatus including a cup-shaped member having one end thereof adapted to form a seat for an orange or similar fruit, a cylinder reciprocable through said seat and into and out of the fruit placed thereon, cutting knives yieldingly mounted in said cylinder and having their edges in contact with the edge of said seat, said knives being mounted to project laterally from said cylinder when the cylinder is projected axially from said member, and means for rotating said cylinder.

5. In a fruit juice extractor, a cylinder having one edge beveled to form a cutter, a conical member secured within said cylinder between the ends thereof, said cylinder having slots extending lengthwise thereof and said conical member being provided with radial slots, and a support for said cylinder having a bore coaxial with said cylinder and member.

6. In a fruit juice extractor, a cup-shaped seat adapted to receive an orange or similar fruit and having a central bore therethrough, lugs extending radially from said seat and adapted to support the seat on a container, a cylinder extending from said seat coaxial with said bore and having apertures therethrough, and a conical member provided with radial slots and secured in said cylinder between the ends thereof.

7. A fruit juice extracting apparatus, a seat adapted to receive and be sealed by an orange or similar fruit, means for extracting juice from the fruit positioned on said seat, a capping machine, means for conducting fruit juice from said seat to the capping machine, and means for exhausting air from said conducting means and seal when the latter is sealed by contact with said fruit.

8. Fruit juice extracting apparatus including a cup-shaped member having one end thereof adapted to form a seat for an orange or similar fruit and to be sealed by contact with said fruit, a fruit juice extractor rotatably mounted in said seat and reciprocable therethrough, means for rotating said extractor, means for reciprocating said extractor, a capping machine, means for conducting extracted juice from said seat to said machine, and means for exhausting air from said conducting means and member when the latter is sealed by contact with fruit sealed thereon.

9. Fruit juice extracting apparatus including a cup-shaped member having one end thereof adapted to form a seat for an orange or similar fruit, a fruit juice extractor comprising a cylinder having slots extending longitudinally therethrough, a conical member seated in said cylinder between the ends thereof, a cutting knife yieldingly connected to said member and having the cutting edge constantly in contact with said seat and adapted to be projected through one of said slots, and means for rotating and reciprocating said cylinder and cutting member relative to said seat.

10. Fruit juice extracting apparatus including a cup-shaped member having one end thereof adapted to form a seat for an orange or similar fruit, a fruit juice extractor comprising a cylinder having slots extending longitudinally therethrough, a support within said cylinder, cutting knives yieldingly mounted on said support and having their cutting edges in constant contact with the edge of said seat and adapted to be moved through the slots in said cylinder, and means for reciprocating and rotating said cylinder relative to said seat.

11. In a fruit juice extractor, a seat adapted to receive an orange or similar fruit and having a central bore therethrough, said seat being adapted to be supported by a container, a cylinder extending from said seat coaxial with said bore, and a stop member secured within said cylinder between the ends thereof, said cylinder being provided with apertures in the periphery thereof and on opposite sides of said stop member.

JAMES L. MAULL.